US010497163B1

United States Patent
Sachania et al.

(10) Patent No.: US 10,497,163 B1
(45) Date of Patent: Dec. 3, 2019

(54) COMPUTER ARCHITECTURE FOR ANIMATION OF A CHARACTER IN A SIMULATION BASED ON MUSCLE ACTIVATION DATA

(71) Applicant: Electronic Arts Inc., Redwood City, CA (US)

(72) Inventors: Jalpesh Sachania, Guildford (GB); Tom Waterson, Hampshire (GB); Fabio Zinno, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 235 days.

(21) Appl. No.: 15/597,019

(22) Filed: May 16, 2017

(51) Int. Cl.
- *A63F 13/00* (2014.01)
- *G06T 13/40* (2011.01)
- *A63F 13/42* (2014.01)
- *A63F 13/52* (2014.01)
- *A63F 13/56* (2014.01)
- *A63F 13/58* (2014.01)
- *A63F 13/32* (2014.01)
- *A63F 13/33* (2014.01)

(52) U.S. Cl.
CPC .............. *G06T 13/40* (2013.01); *A63F 13/32* (2014.09); *A63F 13/33* (2014.09); *A63F 13/42* (2014.09); *A63F 13/52* (2014.09); *A63F 13/56* (2014.09); *A63F 13/58* (2014.09)

(58) Field of Classification Search
None
See application file for complete search history.

(56) References Cited

U.S. PATENT DOCUMENTS

| | | | | |
|---|---|---|---|---|
| 6,084,168 A | * | 7/2000 | Sitrick | G09B 15/023 84/477 R |
| 6,377,281 B1 | * | 4/2002 | Rosenbluth | A63J 19/00 345/473 |
| 2003/0110925 A1 | * | 6/2003 | Sitrick | G09B 15/002 84/477 R |
| 2004/0192424 A1 | * | 9/2004 | Mori | A63F 13/10 463/8 |
| 2006/0184336 A1 | * | 8/2006 | Kolen | G01C 19/00 702/150 |
| 2007/0156625 A1 | * | 7/2007 | Visel | G06K 9/00335 706/62 |
| 2009/0226049 A1 | * | 9/2009 | Debevec | G06K 9/00221 382/118 |
| 2010/0134501 A1 | * | 6/2010 | Lowe | G06T 13/40 345/474 |
| 2010/0164862 A1 | * | 7/2010 | Sullivan | G06K 9/3216 345/156 |

(Continued)

*Primary Examiner* — Paul A D'Agostino
(74) *Attorney, Agent, or Firm* — McDermott Will & Emery LLP (57) ABSTRACT

Methods for improving animation of a character in a simulation by using physics driven by muscle activation data are provided. In one aspect, a method includes detecting a first trigger for a character to perform a movement. Animation data for the character is selected based on the first trigger. A muscle state corresponding to a body part of the character is determined based on the animation data. The movement is performed based on the animation data. A second trigger for altering the movement is detected. The movement is changed based on the muscle state and the second trigger. Systems and machine-readable media are also provided.

20 Claims, 8 Drawing Sheets

(56) References Cited

U.S. PATENT DOCUMENTS

| | | | |
|---|---|---|---|
| 2011/0148884 A1* | 6/2011 | Zeleny | G10H 1/0008 345/441 |
| 2011/0246509 A1* | 10/2011 | Migita | A61B 5/743 707/769 |
| 2014/0104282 A1* | 4/2014 | Sheerin | G06T 13/40 345/473 |
| 2014/0139619 A1* | 5/2014 | Wang | H04N 21/234336 348/14.13 |
| 2014/0282105 A1* | 9/2014 | Nordstrom | H04L 65/403 715/753 |
| 2018/0165864 A1* | 6/2018 | Jin | G09G 5/00 |
| 2018/0276185 A1* | 9/2018 | Kaldma | G06F 17/218 |

* cited by examiner

COMPUTER ARCHITECTURE FOR ANIMATION OF A CHARACTER IN A SIMULATION BASED ON MUSCLE ACTIVATION DATA

TECHNICAL FIELD

The present disclosure generally relates to computer architecture for animation of a character in a simulation, and more specifically to computer architecture for animation of the character in a physics simulation driven by muscle activation data. The present disclosure describes improved resource utilization to produce realistic character movement animations without requiring significant extra processing or hardware.

BACKGROUND

Video games, such as sports video games, provide ever increasing realistic game-playing experiences. Although a video game may recreate characters in a simulation, the characters may not move realistically. Motion capture may produce more realistic character animation. However, motion capture may not account for changes in movement, for example if the animation is interrupted.

The description provided in the background section should not be assumed to be prior art merely because it is mentioned in or associated with the background section. The background section may include information that describes one or more aspects of the subject technology.

SUMMARY

The disclosed system provides for animating a character doing an action in a simulation using muscle activation data to respond to changes to the action. The muscle activation data simulates real muscle tension of a person performing the action.

According to certain aspects of the present disclosure, a system for improving animation of a character in a simulation by using muscle activation data is provided. The system includes a memory comprising instructions and a processor configured to execute the instructions. The processor is configured to execute the instructions to detect a user input for a character to perform a movement and select animation data for the character based on the user input. The processor is configured to execute the instructions to determine a muscle state corresponding to a body part of the character based on the animation data. The muscle state changes during the movement. The processor is configured to execute the instructions to render the character based on the muscle state. The processor is configured to execute the instructions to perform the movement based on the animation data. The processor is configured to execute the instructions to detect a collision between the character and another object in the simulation, and change a motion of the body part based on the collision and the muscle state at a time in the movement when the collision is visualized.

According to certain aspects of the present disclosure, a non-transitory machine-readable storage medium comprising machine-readable instructions for causing a processor to execute a method for improving animation of a character in a simulation by using muscle activation data is provided. The method includes detecting a first trigger for a character to perform a movement, and selecting animation data for the character based on the first trigger. The method includes determining a muscle state corresponding to a body part of the character based on the animation data. The muscle state changes during the movement. The method includes performing the movement based on the animation data. The method includes detecting a second trigger for altering the movement, and changing the movement based on the second trigger and the muscle state at a time in the movement when the second trigger is detected.

According to certain aspects of the present disclosure, computer-implemented method for improving animation of a character in a simulation by using muscle activation data is provided. The method includes detecting a first trigger for a character to perform a movement, and selecting animation data for the character based on the first trigger. The method includes determining a muscle state corresponding to a body part of the character based on the animation data. The method includes performing the movement based on the animation data. The method includes detecting a second trigger for altering the movement, and changing the movement based on the muscle state and the second trigger.

According to certain aspects of the present disclosure, a system for improving animation of a character in a simulation by using muscle activation data is provided. The system includes means for detecting a first trigger for a character to perform a movement. The system includes means for selecting animation data for the character based on the first trigger. The means for selecting are further configured for determining a muscle state corresponding to a body part of the character based on the animation data. The muscle state changes during the movement. The system includes means for performing the movement based on the animation data. The means for detecting are further configured for detecting a second trigger for altering the movement. The means for performing are further configured for changing the movement based on the second trigger and the muscle state at a time in the movement when the second trigger is detected.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for improving movement animation of a character in a simulation by using muscle activation data. The muscle activation data may be used for deformation of the animation. For example, when a character's animation is interrupted by a force, animating use of a muscle state of a body part of the character may produce a more realistic response movement of the body part.

The disclosed system addresses a technical problem tied to computer technology and arising in the realm of computer networks, namely the technical problem of efficient and accurate movement animation of a character in a simulation. The disclosed system solves this technical problem by a technical solution of introducing additional parameters to determine movement response of body parts of the character. The additional parameters may correspond to muscle activation data, for example, for each moving body part of the character. Using the muscle activation data, the body parts may be realistically simulated in response to external forces to produce a realistic animation. Although realistic animation of the character in response to external forces may be achieved by using animation data that accounts for every, or nearly every possible response to external forces, such an animation data set may require a prohibitively large amount of storage, memory, and processing to utilize. The disclosed system uses a smaller data set—muscle activation data that may be appended to animation data—to calculate and simulate body part movement.

While many examples are provided herein in the context of a video game, the principles of the present disclosure contemplate other types of simulations as well. For example, military simulations, medical simulations, emergency response simulations, choreography simulations, motion picture simulations, and other simulations involving moving people simulating realistic movement are all considered within the scope of the present disclosure.

Example System Architecture

Figure 1:
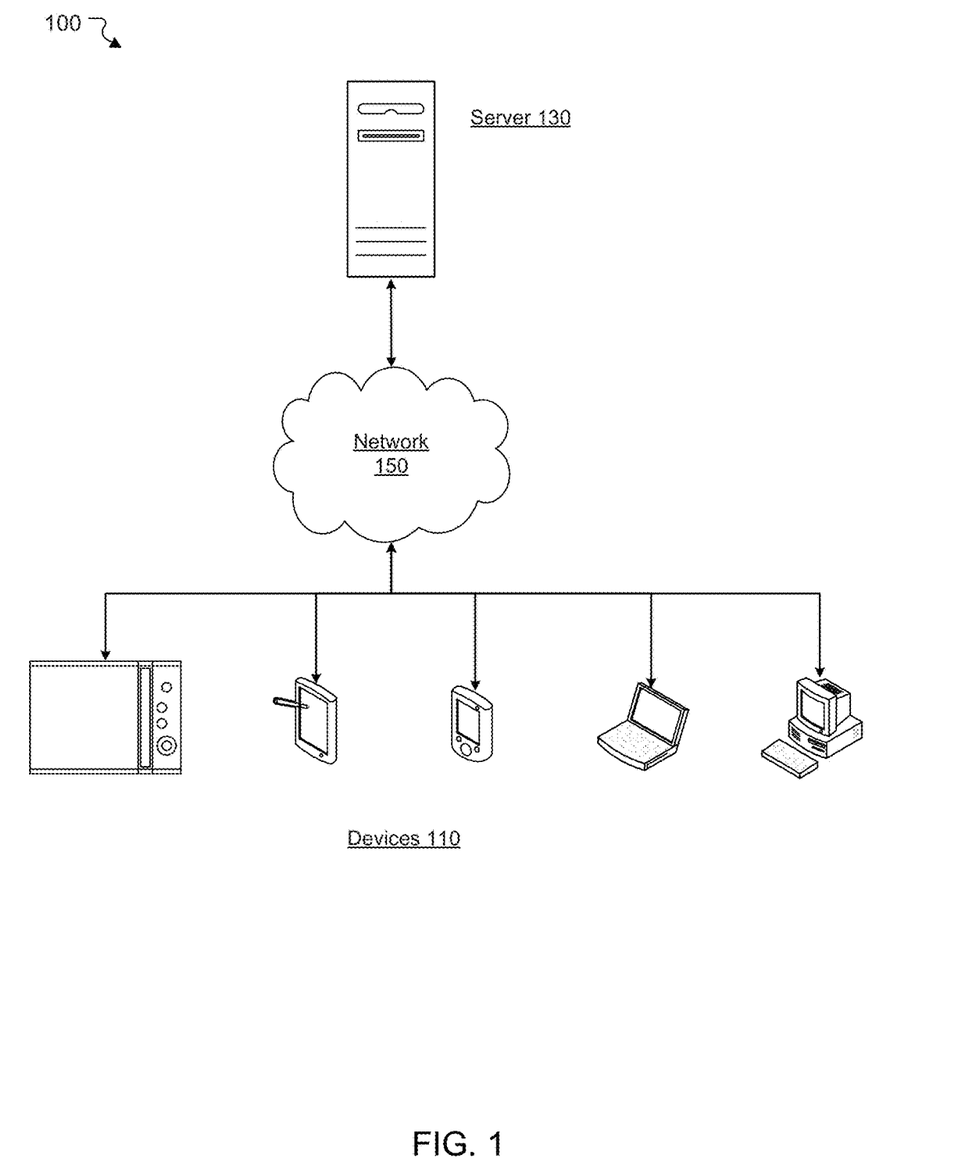
FIG. 1 illustrates an example architecture for improving animation of a character in a simulation by using muscle activation data.

FIG. 1 illustrates an example architecture 100 for improving animation of a character in a simulation by using muscle activation data. The architecture 100 includes one or more servers 130 and devices 110 connected over a network 150.

One of the many servers 130 is configured to host application data, such as application data for a simulation or video game. For purposes of load balancing, multiple servers 130 can host the application data. The server 130 may further be configured to host simulations for multiple devices 110. For example, the server 130 may host a multiplayer simulation for multiple devices 110 to connect to, such that the multiple devices 110 experience the same simulation at approximately the same time.

The devices 110 include one or more computing devices. The devices 110 may include devices capable of running a simulation engine, such as a sports game, for simulating sporting events, a first person shooter (FPS) game, a first person video game, a driving simulator game, an open world (or free roam or sandbox) game, or any other type of simulation or game having objects move according to simulated real-world physics. For example, the devices 110 may include stationary video game consoles, tablets, mobile devices, laptop computers, desktop computers, and/or other devices capable of running a sports game.

The disclosed system uses application data to coordinate the simulations across the devices 110. The server 130 sends the portions of the application data to one or more devices 110, which uses the application data to run similar instances of the simulation. As such, the disclosed system can, for example, create a consistent simulation across the devices 110.

In addition, according to certain aspects of the disclosure, the simulation may be hosted locally, for example on one of the devices 110, or between two or more devices 110 such that application data is shared between the devices 110 rather than being generated by the server 130.

The servers 130 can be any device having an appropriate processor, memory, and communications capability for hosting application data. The devices 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Simulation of Character Movement

Figure 2:
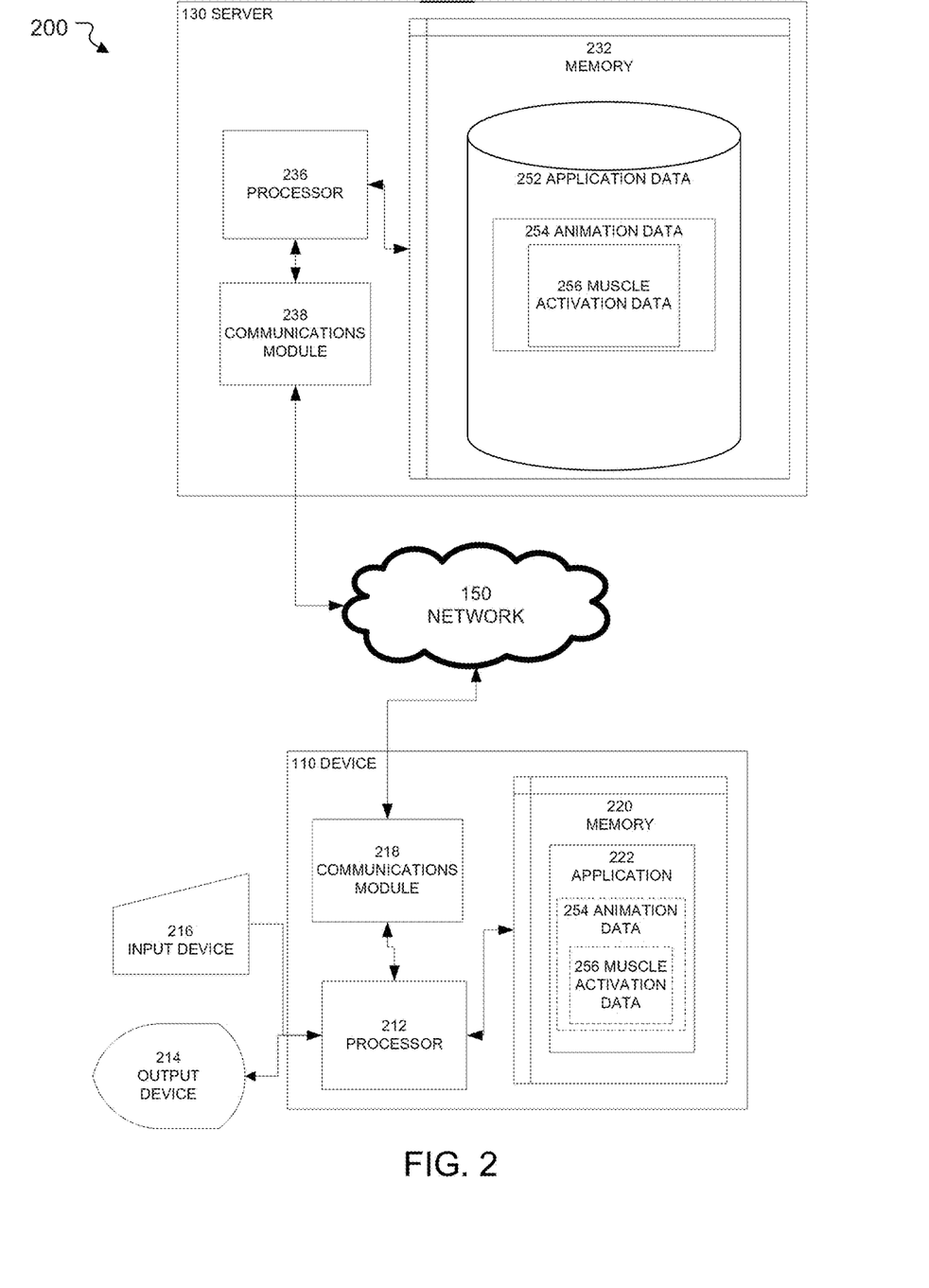
FIG. 2 is a block diagram illustrating the example device and server from the architecture of FIG. 1 according to certain aspects of the disclosure.

FIG. 2 is a block diagram 200 illustrating an example server 130 and device 110 in the architecture 100 of FIG. 1 according to certain aspects of the disclosure.

The device 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes application data 252. The application data 252 corresponds to data for hosting a simulation, such as a multiplayer video game. The application data 252 may include data for generating the simulation, such as models of characters, models of the environment (e.g., maps), textures, environment variables and parameters, and other data for generating the simulation. Although the present disclosure describes the simulation as a multiplayer video game, in other implementations the simulation may allow spectators to view the simulation without controlling objects or characters within the simulation.

The processor 236 of the server 130 is configured to execute instructions, such as instructions physically coded into the processor 236, instructions received from software in memory 240, or a combination of both. For example, the processor 236 of the server 130 executes instructions to send at least a portion of the application data 252 to one or more devices 110. The application data 252 includes animation data 254, which includes muscle activation data 256.

The animation data 254 includes data for animating movement or sequences of movements for characters in the simulation. For example, the animation data 254 may include data for rotating and translating body parts of a character for every action the character can take in the simulation. The muscle activation data 256 includes data corresponding to muscle activity associated with each movable body part.

Although FIG. 2 depicts the application data 252, the animation data 254, and the muscle activation data 256 in the memory 232 of the server 130, in other implementations the memory 220 of the device 110 may include the application data 252, the animation data 254, and the muscle activation data 256, or local copies thereof.

The device 110 includes a processor 212, the communications module 218, and the memory 220 that includes the application 222. The application 222 may be a simulation engine, or software capable of simulating moving objects, such as a video game. The device 110 also includes an input device 216, such as a keyboard, mouse, touchscreen and/or game controller, and an output device 214, such as a display. The processor 212 of the device 110 is configured to execute instructions, such as instructions physically coded into the processor 212, instructions received from software in memory 220, or a combination of both. The processor 212 of the device 110 executes instructions from the application 222 causing the processor 212 to detect a first trigger for a character to perform a movement in a simulation corresponding to the application 222. The first trigger may correspond to a user input from the input device 216, or may correspond to a movement based on a contact with another model or object in the simulation. For example, the user may have input a punch command with the input device 216. Executing the instructions also causes the processor 212 to select animation data for the character based on the first trigger. For example, the processor 212 selects a punch animation for the character based on the punch command. Executing the instructions also causes the processor 212 to determine a muscle state corresponding to a body part of the character based on the animation data. For example, the punch animation data may include muscle activation data for the character's arms during the punch motion, which may be used to determine the muscle states for the character's arms. The character's punching arm may be tense while the character's other arm may be relaxed. Executing the instructions also causes the processor 212 to perform the movement based on the animation data. Performing the movement may include rendering the character based on the muscle state. For instance, the character's facial expression may reflect physical exertion if the muscle state is tense for multiple body parts. Rendering the character may include rendering a muscle tightness of the body part based on the muscle state. For example, the character's punching arm may be rendered with tense muscles while the other arm is rendered with relaxed muscles. Rendering the character may include rendering a perspiration based on the muscle state. For example, if many body parts had tense muscle states, the character may be rendered with perspiration. The muscle state may change during the movement. For instance, at the beginning of the punch, the punching arm's muscles may be tense, and later relax while following through the punch. Executing the instructions also causes the processor 212 to detect a second trigger for altering the movement. The second trigger may correspond to a collision with another object in the simulation. The second trigger may correspond to a collision with a second character performing a second movement based on second animation data. For example, the character's punching arm contacts a face of a second character moving towards the character. Executing the instructions also causes the processor 212 to change the movement based on the muscle state and the second trigger. Changing the movement may include changing a motion of the body part based on the muscle state and the second trigger. Changing the movement may include changing the movement based on the muscle state at a time in the movement when the second trigger is detected. Changing the movement may include changing the movement based on a second muscle state, corresponding to a second body part of the second character, at a time in the second movement when the second trigger is detected. For example, the character's punching arm has tense muscles, whereas the second character's upper body has relaxed muscles. Based on the corresponding muscle states, the character's punching arm is slightly deflected, keeping in line with the relative masses of the body parts, whereas the second character's upper body is deflected more.

The animation data 254 may be based on motion captured data. A human actor is recorded performing each action that characters in the simulation may take. The human actor may wear a motion capture suit, which has a series of markers at various human joints. Motion capture sensors sample the locations of the markers many times per second as the human actor performs an action, which is recorded as animation data. Character models for each character may include data on joints—corresponding to rotation or translation points—such as between "bones," used herein to describe solid portions of the models connected at the joints. The character models may be based on a skeletal animation technique, which uses a hierarchical set of interconnected bones (e.g. a skeleton or rig) with a surface representation (e.g. skin or mesh). Each bone has a three-dimensional transformation, including position, scale, and orientation. The transformation of each bone includes transformations of any parent bones in the hierarchy. For example, moving an arm bone would also move a hand bone which is a child of the arm bone. Each bone is skinned to complete the visual representation of the model, for example by applying a polygonal mesh based on vertices associated with the bone.

The character model joints and bones may correspond to the human joints and bones or limbs such that the animation data provides location and orientation data for the character model joints and bones throughout the action. By using the animation data to animate the character, the character model may move similar to the human actor. In alternative implementations, the animation data may be captured in other ways, such as other types of motion capture, mathematically calculated through physics simulation, or other methods.

Figure 3A:
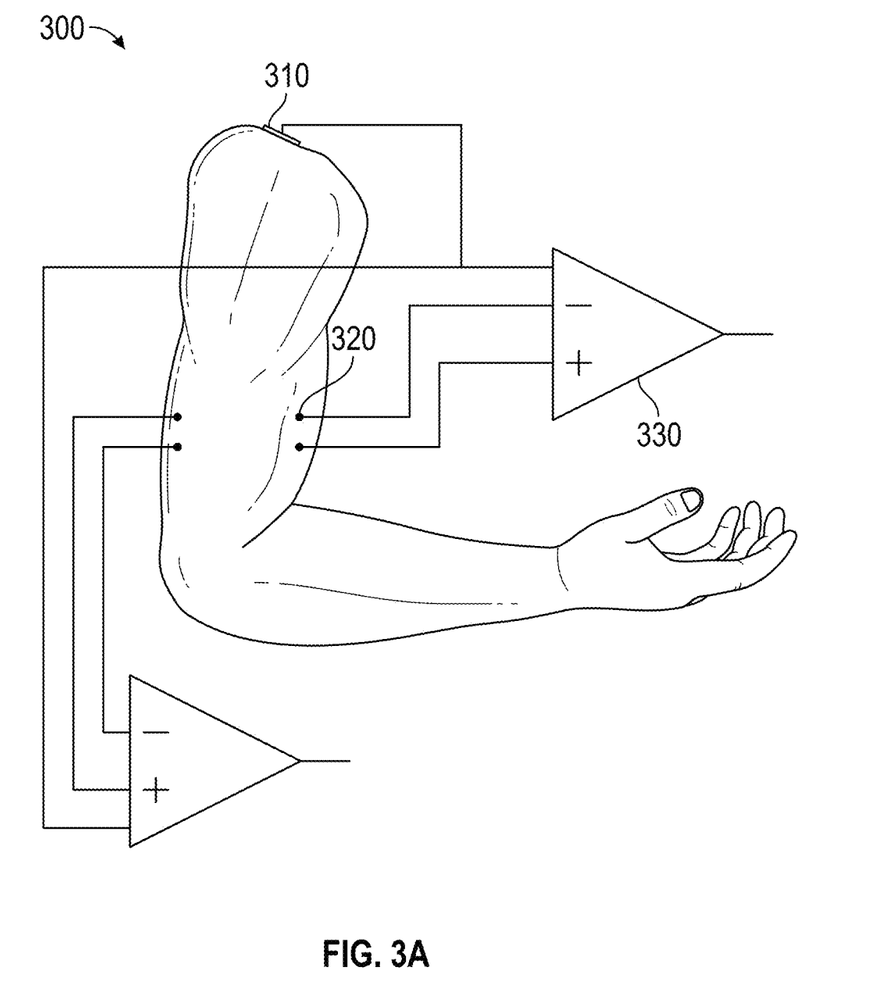
FIG. 3A is a diagram illustrating an example sensor for capturing muscle activation data according to certain aspects of the disclosure.

The muscle activation data 256 may be captured from human actors performing actions. The muscle activation data 256 may be determined by recording electromyography (EMG), which is a measurement of electrical activity in muscles during muscle contraction. FIG. 3A illustrates an example sensor 300 for capturing muscle activation data 256. The sensor 300 includes one or more reference or ground electrodes 310, one or more measuring electrodes 320, and one or more amplifiers 330. The measuring electrodes 320 are placed on muscles, such as bicep and triceps in FIG. 3A. The ground electrode 310 is placed where there is no muscle. The signals from the measuring electrodes 320 and ground electrode 310 are sent to the amplifier 330. The amplifier 330 eliminates electrical noise by subtracting the signal from the ground electrode 310 from the signal from the measuring electrodes 320, to produce a raw EMG signal.

Figure 4:
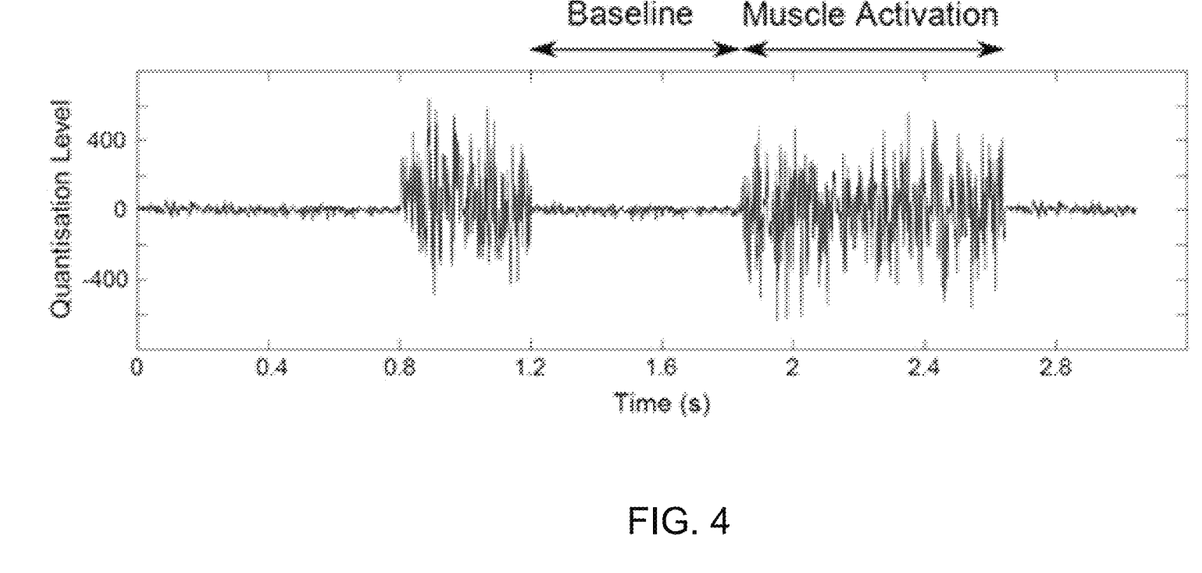
FIG. 4 is an example graph of muscle activation data according to certain aspects of the disclosure.

FIG. 4 illustrates a graph 400 of a raw EMG signal. As seen in FIG. 4, a baseline portion 410 shows a low frequency signal, corresponding to a baseline or no muscle activity. A muscle activation portion 420 shows a high frequency signal, corresponding to muscle contraction or activation. Although the muscle activation data 256 may be stored as raw EMG signals, in implementations the raw EMG signals may be further processed. For example, based on the strength of the signal, the raw EMG signals may be converted into muscle state values, such as between zero (0) and one (1), inclusive, wherein zero corresponds to a relaxed muscle state, and one corresponds to a fully tensed muscle state. Alternatively, the raw EMG signals may be converted into discrete states, such as relaxed, partially relaxed, partially tensed, fully tensed, etc.

Figure 3B:
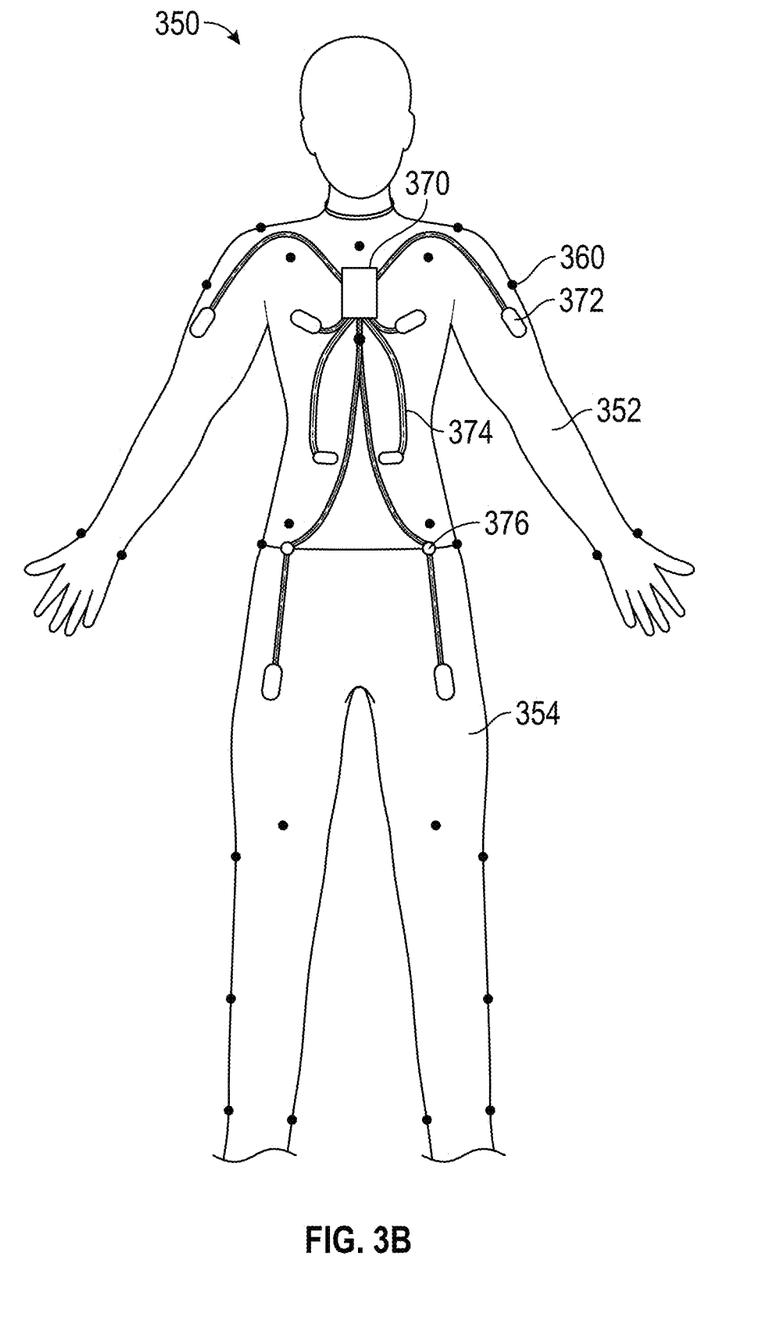
FIG. 3B illustrates an example sensor suit for capturing muscle activation data according to certain aspects of the disclosure.

To ensure that the correct muscle activation value corresponds to the correct joint and bone locations at a given moment or frame during the animation, the muscle activation may be recorded simultaneously with the joint and bone location recordation. For example, the muscle activation may be recorded during motion capture. FIG. 3B illustrates an example sensor suit 350 for capturing the animation data 254 and the muscle activation data 256 simultaneously. The sensor suit 350 includes a top 352, a bottom 354, one or more motion capture markers 360, a muscle signal control unit 370, one or more muscle electrodes 372, one or more wires 374, and one or more wire junctions 376.

The top 352 may be a long sleeve compression top having a neutral color, such as black, that will not be read by motion capture sensors. The bottom 354 may be a set of compression tights, also of the neutral color. Although FIG. 3B illustrates a two-piece sensor suit 350, in other implementations the sensor suit 350 may comprise more or fewer pieces.

The motion capture markers 360 are markers, such as colored balls, LEDs, etc., which may be read by the motion capture sensors to determine the locations of human joints and bones as the human actor performs actions. The motion capture markers 360 are placed along the top 352 and the bottom 354, for example near joints, bones, and other prominent locations as needed to capture the animation data 254.

The muscle activation data 256 is captured using the muscle signal control unit 370, the muscle electrodes 372, the wires 274, and the wire junctions 376. The muscle electrodes 372 may be similar to the measuring electrodes 320 and ground electrode 310 seen in FIG. 3A. The muscle signal control unit 370 includes circuitry, which may include an amplifier similar to the amplifier 330, and other circuitry to receive and filter EMG signals detected by the muscle electrodes 372. The muscle signal control unit 370 includes wireless communications capabilities, such as Bluetooth, Wi-Fi, or other wireless communication, to send data to a computer for processing and saving the data as the muscle activation data 256. Alternatively, the muscle signal control unit 370 may include processing and data storage capabilities to locally store the muscle activation data 256, to be transferred later. The muscle signal control unit 370 may be placed at the sternum, although it may be placed elsewhere in other implementations.

The muscle electrodes 372 are placed near the muscle groups being recorded, such as pectorals, biceps, triceps, abdominals, latissimus dorsi, quadriceps, and gluteus maximus. The muscle electrodes 372 may be under the material of the top 352 and the bottom 354 in order to have direct contact with the human actor's skin. Alternatively, based on the material of the top 352 and the bottom 354, the muscle electrodes 372 may be integrated with the material of the top 352 and the bottom 354, or placed over the material. The muscle electrodes 372 are connected to the muscle signal control unit 370 by the wires 374. The wires 374 may be outside of the top 352 and the bottom 354, and may further be covered to prevent damage, loose connections, etc. Alternatively, based on the material, the wires 374 may be woven into or integrated with the material, or placed under the material. In certain implementations, the material may vary based on the locations of the muscle electrodes 372, the wires 374, the wire junctions 376, and the motion capture markers 360. The wire junctions 376 connect the wires 374 on the bottom 354 to the muscle signal control unit 370. The wire junctions 376 may be, for instance, exposed electrodes which overlap when the top 352 and the bottom 354 is worn, or may be another type of conductive connector.

The sensor suit 350 allows both the animation data 254 and the muscle activation data 256 to be captured simultaneously, such that accurate muscle activation values are recorded when each frame of animation is sampled during the human actor's movement. Capturing the muscle activation data 256 asynchronously with the animation data 254 may result in inaccurate muscle activation values for specific muscles during specific motions.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
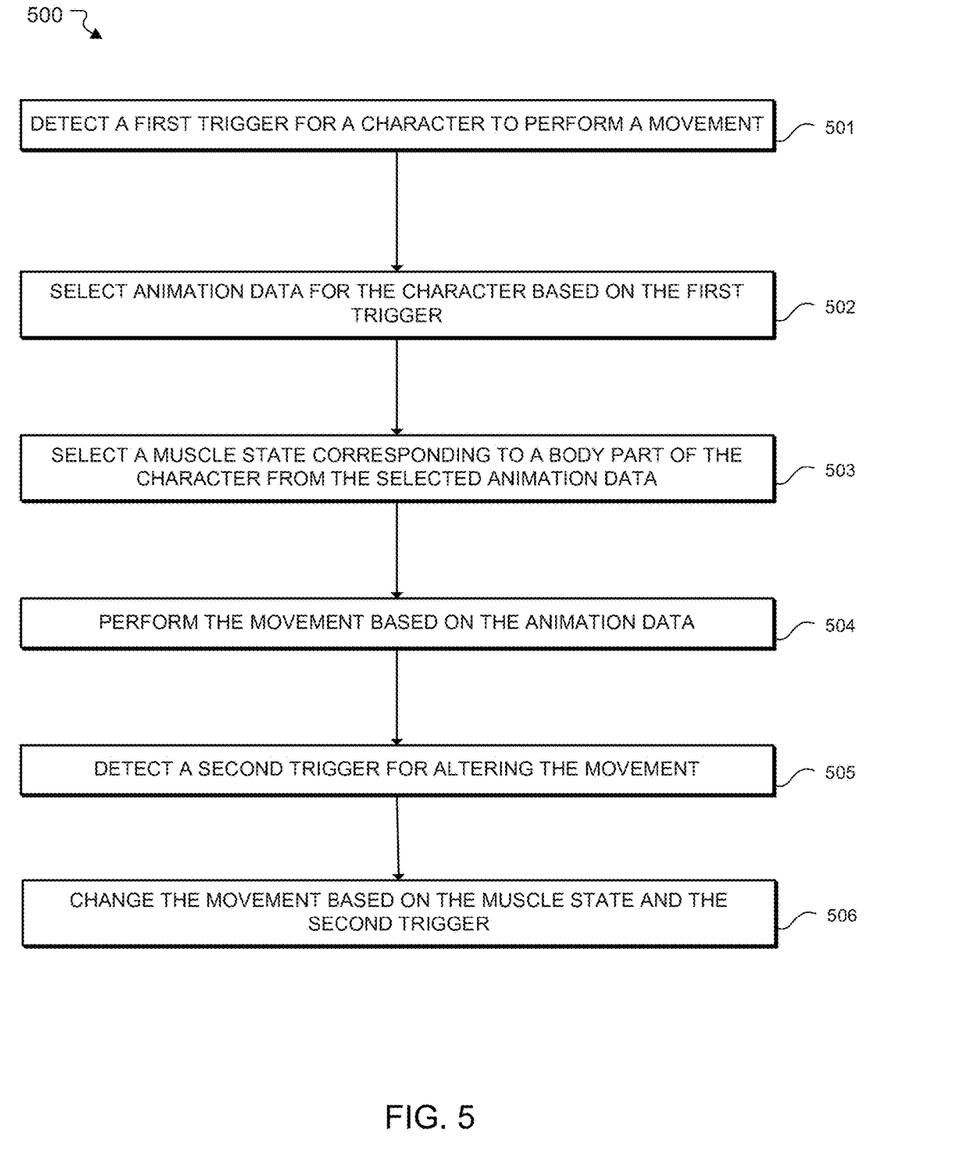
FIG. 5 illustrates an example process for improving animation of a character in a simulation by using muscle activation data, using the example device/server of FIG. 2.

FIG. 5 illustrates an example process 500 for improving animation of a character in a simulation by using muscle activation data, using the example device 110 of FIG. 2. While FIG. 5 is described with reference to FIG. 2, it should be noted that the process steps of FIG. 5 may be performed by other systems. In addition, the process 500 is not limited to the specific order of steps presented in FIG. 5.

The process 500 begins by proceeding to step 501 when, for example the device 110 detects a first trigger for a character to perform a movement. The first trigger may be a user input to move the character, for example the user inputting a command to make the character perform a specific action. The first trigger may be a collision or contact with another object in the simulation or other external force acting upon the character, such that the character may move or perform an action in response. Alternatively, the first trigger may be a trigger to start a default action, or a trigger to start an idle action, such that the character is performing minimal to no movement. For example, the idle action may be standing in place while breathing or slightly swaying, in response to no movement triggers for a predetermined amount of time.

At step 502, the device 110 selects animation data from the animation data 254 for the character based on the first trigger. The selected animation data corresponds to the action that the character should perform in response to the first trigger. For example, the selected animation data may correspond to the specific action inputted by the user, or may correspond to the idle action. The selected animation data may be any other action that has not yet been deformed by an external force.

At step 503, the device 110 determines a muscle state corresponding to a body part of the character based on the selected animation data. For example, the device 110 selects the muscle state corresponding to the body part of the character from the captured muscle activation data stored alongside the selected animation data. The muscle state may be used to further animate the character. For example, particularly in a close or zoomed in view, the muscle state may be used to render a muscle tightness of the body part, such as a flexed bicep. Further details, such as veins, may be rendered based on the muscle state. The muscle state may be used to render perspiration, for example increased perspiration based on the fully tensed muscle state.

Figure 6A:
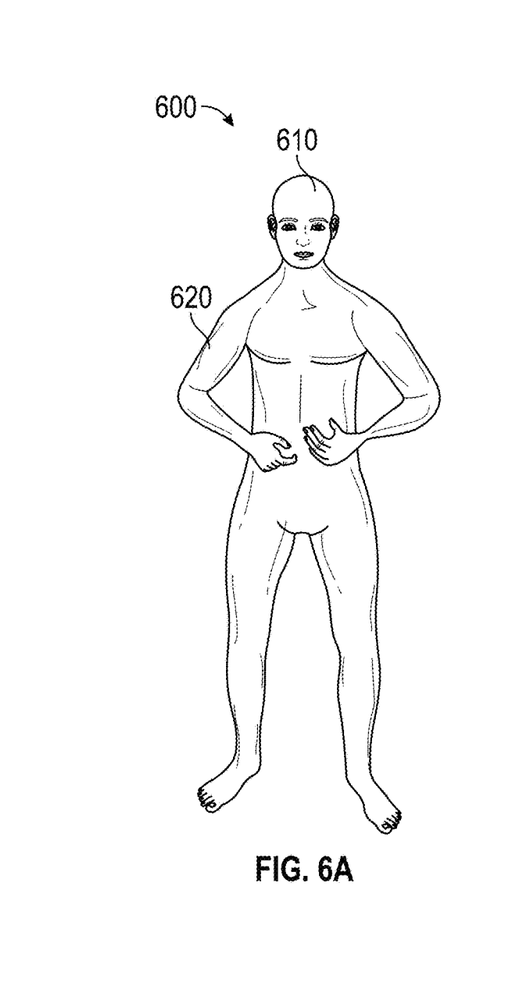
FIG. 6A is an example illustration of a frame of animation of a character in an initial state.

At step 504, the device 110 performs the movement based on the selected animation data. The device 110 renders the character based on the selected animation data and displays the rendered character on the output device 214. The device 110 further renders the character based on the determined muscle state, for example the muscle tightness, veins, and perspiration as described above. The device 110 may further render additional details based on the determined muscle state, such as increasing a breathing rate, or other physiological details corresponding to the determined muscle state. FIG. 6A shows a character 610 and an arm 620 in an idle action animation. The idle action animation is the character 610 in a standing position.

Returning to FIG. 5, at step 505, the device 110 detects a second trigger for altering the movement. The device 110 continues to perform and render the movement until the second trigger is detected. The second trigger causes deformation of the current animation. The second trigger may be a user input that interrupts the current animation for another animation. Alternatively, the second trigger may be caused by an external force, such as contact or collision with another character or object in the simulation. For example, the second trigger may be a second character hitting or punching the character. In FIG. 6A, the second trigger is a pull on the arm 620. Because the muscle activation data 256 is synchronized with the animation data 254, the muscle state can be determined at the moment when the second trigger is detected.

Returning to FIG. 5, at step 506, the device 110 changes the movement based on the muscle state and the second trigger. The device 110 determines how the current animation is deformed by the second trigger, renders the character according to the deformed animation, and displays the rendered character on the output device 214. The deformed animation is based on the physics simulation, which takes into account the external force corresponding to the second trigger as well as the muscle state. The muscle state affects how the animation deforms in response to the second trigger. In other words, the more tense the muscle is, the more the external force will be resisted.

Figure 6B:
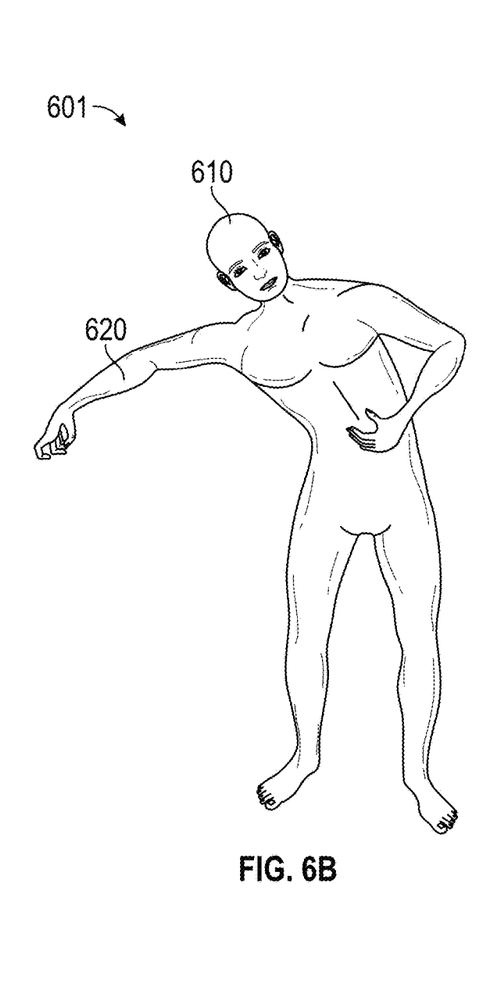
FIG. 6B is an example illustration of a frame of animation of the character of FIG. 6A reacting to a force with a relaxed muscle state, according to certain aspects of the disclosure.
Figure 6C:
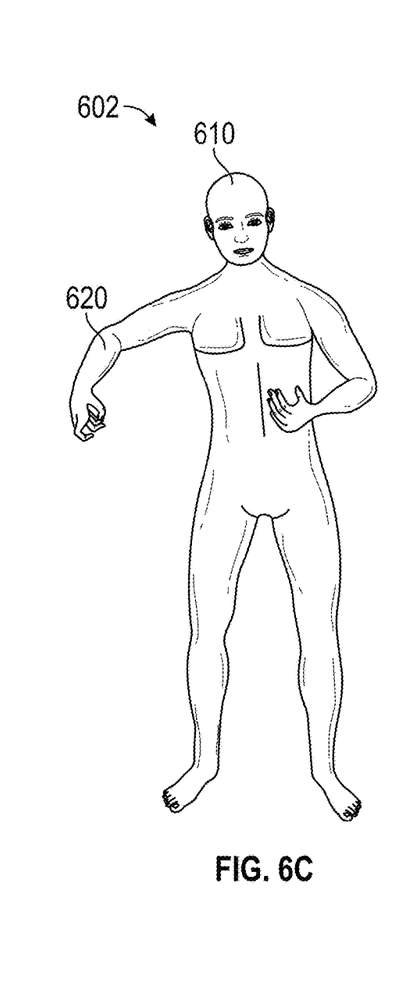
FIG. 6C is an example illustration of a frame of animation of the character of FIG. 6A reacting to the force of FIG. 6B, with a tensed muscle state, according to certain aspects of the disclosure.

FIGS. 6B and 6C show how the animation deforms based on the muscle state. In FIG. 6B, the muscle state is relaxed, for example having a value closer to zero than one. The external force pulls on the arm 620. Because the muscle state of the arm 620 is relaxed, there is little resistance to the external force, resulting in the arm 620 being greatly deviated to the point that the body is being pulled.

In FIG. 6C, the muscle state is tensed, for example having a value closer to one than to zero. The external force pulls on the arm 620, similar to FIG. 6B. However, because the muscle state of the arm 620 is tensed, there is more resistance to the external force, resulting in the arm 620 being less deviated than in FIG. 6B and the body not being pulled as much.

When the external force is caused by another character, the external force may be determined by corresponding muscle states of the other character. For example, if an arm of the other character hits the character, the force applied to the character may be weak if the other character's muscle state is relaxed (e.g., a flailing arm), or may be strong if the other character's muscle state is tensed (e.g., throwing a punch). The use of the muscle activation data 256 may provide more realistic responses to animation deformations.

Although the process 500 describes a single iteration of animation deformation, the animation may deform from multiple triggers, each responding based on the muscle states of the affected body parts, which further interact to produce more realistic responses. The body parts may have different muscle states such that some body parts may deviate more than others.

Hardware Overview

Figure 7:
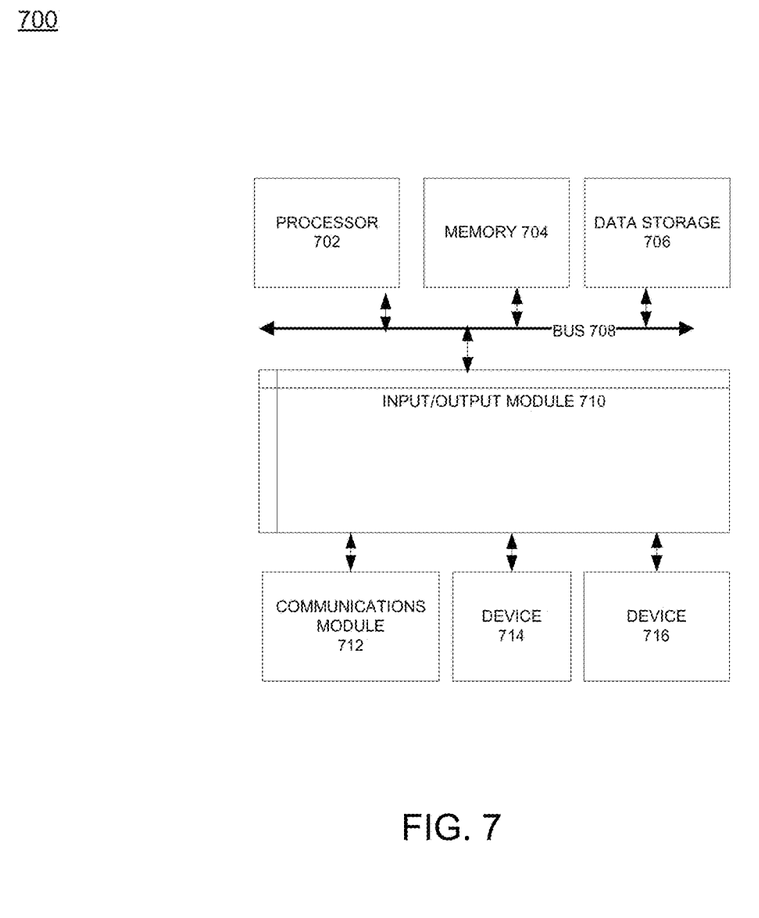
FIG. 7 is a block diagram illustrating an example computer system with which the devices and server of FIG. 2 can be implemented.

FIG. 7 is a block diagram illustrating an example computer system 700 with which the device 110 and server 130 of FIGS. 1 and 2 can be implemented. In certain aspects, the computer system 700 may be implemented using hardware or a combination of software and hardware, either in a dedicated server, or integrated into another entity, or distributed across multiple entities.

Computer system 700 (e.g., device 110 and server 130) includes a bus 708 or other communication mechanism for communicating information, and a processor 702 (e.g., processor 212 and 236) coupled with bus 708 for processing information. According to one aspect, the computer system 600 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 700 may be implemented with one or more processors 702. Processor 702 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 232 or 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry. Expansion memory may also be provided and connected to computer system 700 through input/output module 710, which may include, for example, a SIMM (Single In Line Memory Module) card interface. Such expansion memory may provide extra storage space for computer system 700, or may also store applications or other information for computer system 700. Specifically, expansion memory may include instructions to carry out or supplement the processes described above, and may include secure information also. Thus, for example, expansion memory may be provided as a security module for computer system 700, and may be programmed with instructions that permit secure use of computer system 700. In addition, secure applications may be provided via the SIMM cards, along with additional information, such as placing identifying information on the SIMM card in a non-hackable manner.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices (e.g., input device 216 and/or output device 214). The input/output module 710 can be any input/output module. Example input/output modules 710 include data ports such as USB ports. In addition, input/output module 710 may be provided in communication with processor 702, so as to enable near area communication of computer system 700 with other devices. The input/output module 710 may provide, for example, for wired communication in some implementations, or for wireless communication in other implementations, and multiple interfaces may also be used. The input/output module 710 is configured to connect to a communications module 712. Example communications modules 712 (e.g., communications modules 238 and/or 218) include networking interface cards, such as Ethernet cards and modems.

The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 712 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 712 sends and receives electrical, electromagnetic or optical signals that carry digital data streams representing various types of information. The network link typically provides data communication through one or more networks to other data devices. For example, the network link of the communications module 712 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 712, which carry the digital data to and from computer system 700, are example forms of transmission media.

Computer system 700 can send messages and receive data, including program code, through the network(s), the network link and communications module 712. In the Internet example, a server might transmit a requested code for an application program through Internet, the ISP, the local network and communications module 712. The received code may be executed by processor 702 as it is received, and/or stored in data storage device 706 for later execution.

In certain aspects, the input/output module 710 is configured to connect to a plurality of devices, such as an input device 714 (e.g., input device 216) and/or an output device 716 (e.g., output device 214). Example input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 716 may comprise appropriate circuitry for driving the output device 716 to present graphical and other information to a user.

According to one aspect of the present disclosure, the device 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 702 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 708. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A system for improving animation of a character in a simulation by using muscle activation data, the system comprising:
   a memory comprising instructions;
   a processor configured to execute the instructions to:
   detect a user input for a character to perform a movement;
   select animation data for the character based on the user input;
   determine a muscle state corresponding to a body part of the character based on the animation data, wherein the muscle state changes during the movement;
   render the character based on the muscle state;
   perform the movement based on the animation data;
   detect a collision between the character and another object in the simulation; and
   change a motion of the body part based on the collision and the muscle state at a time in the movement when the collision is visualized, the motion of the body based on motion captured data, the motion captured data comprising muscle activation data, the muscle activation data determined by recording electromyography (EMG).

2. The system of claim 1, wherein the other object is a second character performing a second movement based on second animation data.

3. The system of claim 2, wherein the instructions to change the motion of the body part further comprises instructions to change the motion of the body part based on a second muscle state, corresponding to a second body part of the second character, at a time in the second movement when the collision is visualized.

4. The system of claim 1, wherein the instructions to render the character further comprises instructions to render a muscle tightness of the body part based on the muscle state.

5. The system of claim 1, wherein the instructions to render the character further comprise instructions to render a perspiration based on the muscle state.

6. A non-transitory machine-readable storage medium comprising machine-readable instructions for causing a processor to execute a method for improving animation of a character in a simulation by using muscle activation data, the method comprising:
   detecting a first trigger for a character to perform a movement;
   selecting animation data for the character based on the first trigger;
   determining a muscle state corresponding to a body part of the character based on the animation data, wherein the muscle state changes during the movement;
   performing the movement based on the animation data;
   detecting a second trigger for altering the movement; and
   changing the movement based on the second trigger and the muscle state at a time in the movement when the second trigger is detected, the movement based on motion captured data, the motion captured data comprising muscle activation data, the muscle activation data determined by recording electromyography (EMG).

7. The non-transitory machine-readable storage medium of claim 6, wherein the second trigger is a collision with a second character performing a second movement based on second animation data.

8. The non-transitory machine-readable storage medium of claim 7, wherein changing the movement further comprises changing the movement based on a second muscle state corresponding to a second body part of the second character.

9. The non-transitory machine-readable storage medium of claim 6, wherein rendering the character further comprises rendering a muscle tightness of the body part based on the muscle state, and rendering a perspiration based on the muscle state.

10. A computer-implemented method for improving animation of a character in a simulation by using muscle activation data, the method comprising:
    detecting a first trigger for a character to perform a movement;
    selecting animation data for the character based on the first trigger;
    determining a muscle state corresponding to a body part of the character based on the animation data;
    performing the movement based on the animation data;
    detecting a second trigger for altering the movement; and
    changing the movement based on the muscle state and the second trigger, the movement based on motion captured data, the motion captured data comprising muscle activation data, the muscle activation data determined by recording electromyography (EMG).

11. The computer-implemented method of claim 10, wherein changing the movement comprises changing a motion of the body part based on the muscle state and the second trigger.

12. The computer-implemented method of claim 10, wherein the first trigger is a user input.

13. The computer-implemented method of claim 10, wherein the second trigger is a collision with another object in the simulation.

14. The computer-implemented method of claim 10, wherein performing the movement further comprises rendering the character based on the muscle state.

15. The computer-implemented method of claim 14, wherein rendering the character further comprises rendering a muscle tightness of the body part based on the muscle state.

16. The computer-implemented method of claim 14, wherein rendering the character further comprises rendering a perspiration based on the muscle state.

17. The computer-implemented method of claim 10, wherein the muscle state changes during the movement.

18. The computer-implemented method of claim 17, wherein changing the movement comprises changing the movement based on the muscle state at a time in the movement when the second trigger is detected.

19. The computer-implemented method of claim 18, wherein the second trigger is a collision with a second character performing a second movement based on second animation data.

20. The computer-implemented method of claim 19, wherein changing the movement further comprises changing the movement based on a second muscle state, corresponding to a second body part of the second character, at a time in the second movement when the second trigger is detected.

* * * * *